Aug. 7, 1934.  O. M. LEICH  1,969,376
HARMONIC CONVERTER CIRCUIT
Filed Nov. 13, 1933
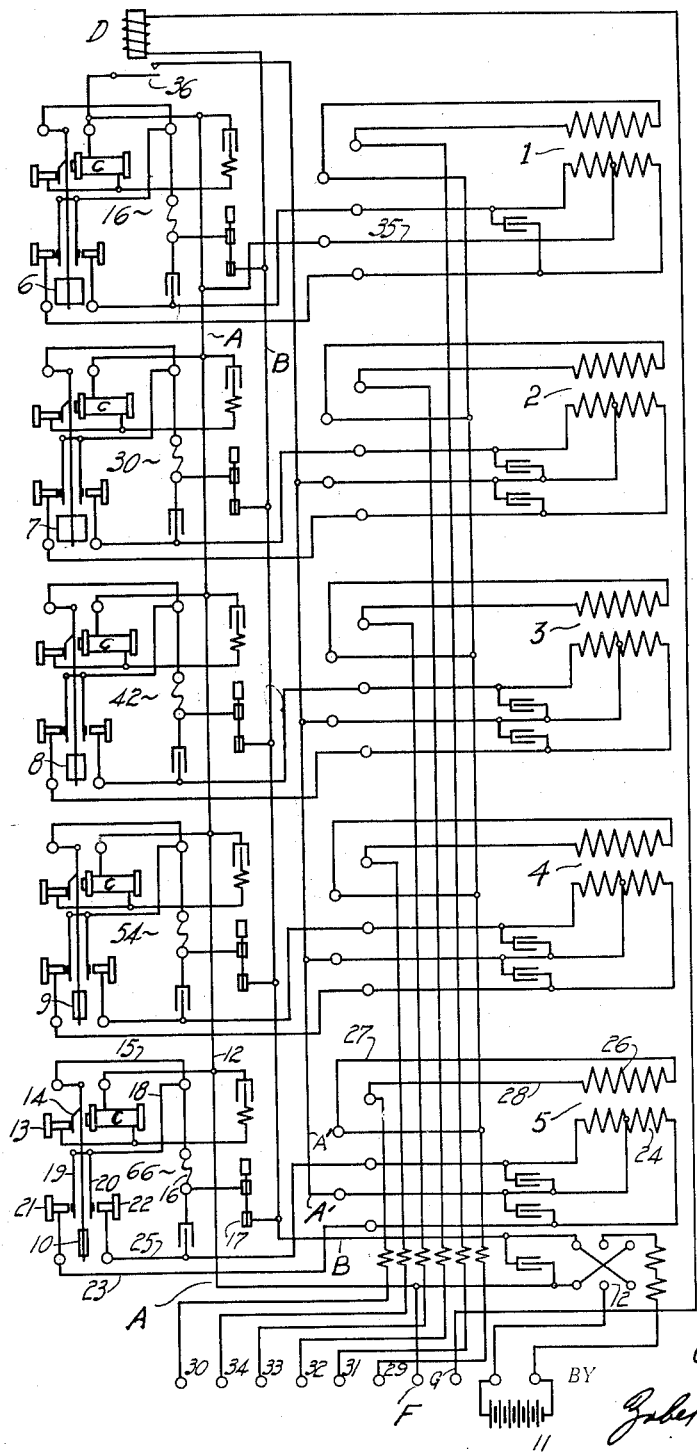
INVENTOR.
Oscar M. Leich
BY
Zabel & Wells.
ATTORNEYS Patented Aug. 7, 1934

1,969,376

UNITED STATES PATENT OFFICE 1,969,376

HARMONIC CONVERTER CIRCUIT

Oscar M. Leich, Genoa, Ill., assignor to Leich Electric Co., Genoa, Ill., a corporation of Illinois Application November 13, 1933, Serial No. 697,759

7 Claims. (Cl. 179—87)

My invention relates to harmonic converter circuits and is particularly applicable to a system of this character in which a plurality of sources of alternating current at different frequencies are to be used for harmonic operation of instrumentalities that are responsive only to certain frequencies as for example the bells used on telephones where two or more parties are on the same line.

It is the principal purpose of my invention to provide in a system of this character means to avoid the power losses in the various transformers by limiting the time of input of energy thereto to the time of requiring energy from one of the outputs of the series of transformers used and to maintain the vibrators which supply the current to the transformers in continuous operation so as to avoid the danger of cross ringing experienced where the vibrator is started only when energy is wanted from its particular transformer.

More specifically my invention contemplates the provision in a harmonic converter circuit of a system wherein the motor vibrator coils for producing the different frequencies are all connected across a source of direct current to operate continuously in conjunction with a series of transformers receiving the pulsating current from the vibrators which transformers have an open primary except that means is provided for closing the input circuits to their primaries when output current is demanded from any one of them.

I will describe the preferred form of my invention by reference to the accompanying drawing which is a diagrammatic view showing the various connections of the equipment making up the converter system.

In the drawing, I have numbered the various transformers from 1 to 5, each transformer having associated therewith a vibrator such as 6, 7, 8, 9, and 10. A battery 11 supplies current through a reversing switch 12 to the main supply lines A and B. These supply lines A and B supply current to the vibrators 6 to 10 so as to operate them continuously. I will briefly describe the circuit for the vibrator 10 which will suffice for all of the vibrators since they are duplicates.

The energizing coil C for the vibrator 10 receives its current over a line extending from line A at point 12 to winding of coil C then to stationary contact 13, contact 14 on vibrator 10, arm of vibrator 10 to line 15, and over line 15 through fuse 16 and switch 17 to line B. The motor coil C of the vibrator will thus be energized to attract the vibrator 10, and this in turn will break the contact between 13 and 14 to again deenergize the coil C and to permit the vibrator to return thus creating a vibration of the member 10 at a frequency depending upon the constants of the vibrator arm. The line B is connected through switch 17, and fuse 16 to line 18 leading to the two arms 19 and 20 on the vibrator 10 which arms cooperate with the stationary contacts 21 and 22. Thus, if arm 19 is in contact with its contact 21, a circuit is completed from line B through switch 17, fuse 16, line 18, contacts 19 and 21, line 23, to input winding 24 of transformer 5. The center tap of this winding 24 leads to main line A' which is adapted to be connected to line A in a manner which will presently be described. In a similar manner, if contacts 20 to 22 are closed, current is supplied over line 25 to the opposite terminal of the input winding 24 of transformer 5 so as to reverse the flux in the transformer thus to produce an alternating current in the output winding 26 of the transformer. The output winding 26 is connected by means of conductors 27 and 28 to the common lead 29 and terminal 30 which lead to the well known ringing switches by means of which the operator supplied ringing current over the subscriber's line in a telephone exchange system.

The remaining transformers 1 to 4 have their outputs connected to the common line 29 on one side and to the terminals 31, 32, 33, and 34 on the other side. It will be noted that the input winding of transformer 1 is connected by means of line 35 directly to main line A so that this transformer is continuously energized. The remaining transformers, however, have their center taps connected to line A' which is adapted to be connected to line A by means of relay D when the operator desires to take current from the output of any one of the transformers.

To energize the relay D, the operator closes a circuit connecting terminals F and G thus to connect the winding of relay D across the lines A and B. This causes this relay D to attract its armature and thus close a circuit at 36 to connect line A to line A' thus completing the input circuit to transformers 2, 3, 4, and 5 so that the operator may use any one of the frequencies generated by the pulsating current flowing through their input windings.

The transformer 1 is used for straight party calls where the ringing load is practically continuous so that no saving in current would be made by having this transformer idle between connections for ringing. If this straight party ringing load is light, however, transformer 1 should also be under control of relay D.

The operating coils such as C of the vibrators require a very low current which can be neglected in the operation of a small exchange. The core losses of the transformers, however, are much larger, and avoiding the energization of the transformers except when current is wanted from the output of one of them results in a substantial saving of energy.

Another advantage gained by this system lies in the fact that the vibrators being in continuous operation are always at the rated frequency so that, when a frequency is selected, there is no danger of cross ringing the bells of other frequencies on the same line. It has been found that, if the vibrators themselves are started and stopped every time they are needed, considerable difficulty is experienced because the vibrators do not arrive at the rated frequency immediately when started.

From the above description, it is believed that the construction and operation of this device will be clear to those skilled in this art and the advantages thereof readily apparent.

Having thus described one specific form of my invention, what I claim as new and desire to secure by Letters Patent is:

1. In a power source for furnishing a plurality of different frequencies of alternating current, a source of electric energy, a plurality of pole changers having different periods of vibration connected to said source of energy and continuously operating, transformers having input windings connected to said pole changers and normally disconnected from said source of energy but adapted to be connected thereto when energy is demanded from their output windings.

2. In a harmonic converter system means for producing power at a plurality of output terminals of transformers when demanded comprising a series of pole changers connected for continuous operation to a source of electric energy, and means for connecting the input windings in circuit with said source of current and pole changers upon demand for output from said transformers.

3. In a system of the character described, a series of continuously working pole changers normally connected to a source of direct current for changing the direct current to pulsating currents, a transformer for each pole changer having an input winding for receiving the pulsating current, the input circuit for said winding being normally open, and means for closing circuits for said pulsating currents through the input windings of their transformers when current is desired from the output winding of one of said transformers.

4. In a signaling system, a source of electric energy, a continuously working pole changer connected thereto, a transformer having an output winding and an input winding, said input winding being normally disconnected from the source of electric energy but adapted to be connected to said source when energy is wanted from the output winding.

5. In a signaling system, a source of electric energy, a continuously working pole changer connected thereto, a transformer having an output winding and an input winding, said input winding being normally disconnected from the source of electric energy, but adapted to be connected by means of a relay to said source when energy is wanted from the output winding.

6. In a signaling system, a source of electric energy, a plurality of continuously working pole changers having different periods of vibration, transformers having output and input windings connected thereto, said input windings being normally disconnected from the source of electric energy, but adapted to be connected when energy is wanted from the output winding.

7. In a signaling system, a source of electric energy, a plurality of pole changers having different periods of vibration, and continuously working, transformers having output and input windings connected thereto, said input windngs being normally disconnected from the source of electric energy, but adapted to be connected when energy is demanded from the output winding.

OSCAR M. LEICH.